US010385963B2

(12) United States Patent
Torii et al.

(10) Patent No.: US 10,385,963 B2
(45) Date of Patent: Aug. 20, 2019

(54) POWER TRANSFER DEVICE (71) Applicant: AISIN AW CO., LTD., Anjo-shi, Aichi-ken (JP)

(72) Inventors: Takeshi Torii, Chiryu (JP); Kazuya Kawamura, Anjo (JP); Tomoki Nishikubo, Anjo (JP); Shinya Yamamoto, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 267 days.

(21) Appl. No.: 15/037,378

(22) PCT Filed: Dec. 17, 2014

(86) PCT No.: PCT/JP2014/083408
§ 371 (c)(1),
(2) Date: May 18, 2016

(87) PCT Pub. No.: WO2015/098650
PCT Pub. Date: Jul. 2, 2015

(65) Prior Publication Data
US 2016/0298756 A1   Oct. 13, 2016

(30) Foreign Application Priority Data
Dec. 26, 2013 (JP) .................................. 2013-269519

(51) Int. Cl.
*F16H 57/04* (2010.01)
*F16H 57/031* (2012.01)
*F16H 57/02* (2012.01)

(52) U.S. Cl.
CPC ....... *F16H 57/0483* (2013.01); *F16H 57/031* (2013.01); *F16H 57/04* (2013.01); *F16H 57/0423* (2013.01); *F16H 57/0424* (2013.01); *F16H 2057/02043* (2013.01)

(58) Field of Classification Search
None
See application file for complete search history.

(56) References Cited

U.S. PATENT DOCUMENTS

| 1,670,471 | A | 5/1928 | Merkt |
| 6,223,858 | B1 * | 5/2001 | Ubagai ............... F16H 57/0423 184/11.1 |
| 8,167,758 | B2 * | 5/2012 | Downs ............... F16H 57/0483 184/11.1 |
| 8,371,978 | B2 | 2/2013 | Nobata et al. |

(Continued)

FOREIGN PATENT DOCUMENTS

| JP | 2011-007208 A | 1/2011 |
| JP | 2011-058519 A | 3/2011 |

(Continued)

OTHER PUBLICATIONS

Mar. 24, 2015 Search Report issued in International Patent Application No. PCT/JP2014/083408.

*Primary Examiner* — Timothy Hannon
(74) *Attorney, Agent, or Firm* — Oliff PLC (57) ABSTRACT

A power transfer device that includes a transmission, a drive pinion gear to which power from the transmission is transferred, a differential ring gear disposed below the drive pinion gear and meshed with the drive pinion gear, a differential gear coupled to the differential ring gear, and a cover that covers at least a part of the differential gear.

18 Claims, 7 Drawing Sheets

(56) References Cited

U.S. PATENT DOCUMENTS

| | | | |
|---|---|---|---|
| 2011/0245010 A1 | 10/2011 | Nobata et al. | |
| 2011/0319215 A1* | 12/2011 | Katoh | B60K 1/00 475/149 |
| 2012/0096968 A1 | 4/2012 | Kawamoto et al. | |
| 2012/0222517 A1* | 9/2012 | Okuta | F16H 57/0423 74/606 R |
| 2013/0145879 A1 | 6/2013 | Nakamura et al. | |
| 2013/0283955 A1* | 10/2013 | Araki | F16H 57/0423 74/467 |
| 2015/0128738 A1* | 5/2015 | Ono | F16H 57/0423 74/339 |
| 2015/0204436 A1* | 7/2015 | Mafune | F16H 57/0409 475/160 |
| 2015/0276043 A1* | 10/2015 | Girardot | F16H 57/0423 475/160 |

FOREIGN PATENT DOCUMENTS

| | | |
|---|---|---|
| JP | 2012-082967 A | 4/2012 |
| JP | 2012-220004 A | 11/2012 |
| JP | 2013-113303 A | 6/2013 |
| JP | 2013-119918 A | 6/2013 |
| WO | 2011/121861 A1 | 10/2011 |

\* cited by examiner

|  | | C-1 | C-2 | C-3 | C-4 | B-1 | B-2 | F-1 |
|---|---|---|---|---|---|---|---|---|
| D | 1st | ○ | | | | | ● | ○ |
| | 2nd | ○ | | | | ○ | | |
| | 3rd | ○ | | ○ | | | | |
| | 4th | ○ | | | ○ | | | |
| | 5th | ○ | ○ | | | | | |
| | 6th | | ○ | | ○ | | | |
| | 7th | | ○ | ○ | | | | |
| | 8th | | ○ | | | ○ | | |
| REV1 | | | | ○ | | | ○ | |
| REV2 | | | | | ○ | | ○ | |

※ ○ : ENGAGED
● : ENGAGED WITH ENGINE BRAKE IN OPERATION.

POWER TRANSFER DEVICE

BACKGROUND

The present disclosure relates to a power transfer device that includes a transmission, a drive pinion gear to which power from the transmission is transferred, a differential ring gear disposed below the drive pinion gear and meshed with the drive pinion gear, a differential gear coupled to the differential ring gear, and a cover member that covers at least a part of the differential gear.

There has hitherto been known a power transfer device that includes a reduction gear (drive pinion gear) to which power from an automatic transmission is transferred, a final gear (differential ring gear) meshed with the reduction gear and meshed with a differential case, and a final gear cover that covers a part of the final gear, in which oil raked up along with rotation of the final gear is led to a meshing portion between the reduction gear and the final gear along the inner surface of the final gear cover to lubricate and cool the reduction gear (see Japanese Patent Application Publication No. 2012-220004, for example). In the power transfer device, a window portion is provided at the middle of the final gear cover, and part of the oil raked up along with rotation of the final gear is discharged to the outside of the final gear cover via the window portion. In addition, a reduction gear cover (shield structure) shaped along the outer periphery of the reduction gear is provided in the vicinity of the reduction gear. Consequently, it is possible to block oil splashed in the direction against the rotational direction of the reduction gear from the window portion using the reduction gear cover, and to suppress an increase in resistance against rotation of the reduction gear.

In addition, there is also known a power transfer device that includes a case member that houses a speed change mechanism and a differential device (differential gear) and a reservoir plate (cover member) that surrounds at least a part of the differential device so as to define a differential chamber in which the differential device is disposed (see International Patent Application Publication No. 2011/121861, for example). In the power transfer device, the reservoir plate is disposed so as to cover the differential device from the side opposite to the case member and tightly contact the inner peripheral surface of a rib member that extends from the case member along the outer peripheral surface of a ring gear (differential ring gear) of the differential device. Consequently, in the power transfer device, an inflow of oil into a space around the ring gear (differential ring gear) of the differential device is prevented to suppress an increase in resistance against rotation of the ring gear.

SUMMARY

Also in the power transfer device described in Japanese Patent Application Publication No. 2012-220004, as in the power transfer device described in International Patent Application Publication No. 2011/121861, it is preferable to remove as much oil as possible from the lower portion of the final gear (differential ring gear) in order to reduce the resistance against rotation of the final gear. In this case, however, the amount of oil raked up by rotation of the final gear is reduced. Therefore, sufficient oil cannot be supplied to the meshing portion between the reduction gear (drive pinion gear) and the final gear, and the meshing portion may not be lubricated and cooled well.

The present disclosure according to an exemplary aspect lubricates and cools a meshing portion between a drive pinion gear and a differential ring gear well even in the case where the amount of working oil raked up by rotation of the differential ring gear is small.

The present disclosure according to an exemplary aspect provides a power transfer device including a transmission, a drive pinion gear to which power from the transmission is transferred, a differential ring gear disposed below the drive pinion gear and meshed with the drive pinion gear, a differential gear coupled to the differential ring gear, and a cover that covers at least a part of the differential gear, wherein: the cover includes a working oil reception that has a bottom, at least a part of which is disposed at a side of the drive pinion gear and above the differential ring gear, and a shield that extends outward in a radial direction of the differential ring gear from an end of the bottom that extends in an axial direction of the differential ring gear on a side opposite to the drive pinion gear; and the bottom has a first slope provided at a side of the drive pinion gear and above the differential ring gear and inclined downward, as the first slope extends away from the shield, such that working oil is led toward a meshing portion between the drive pinion gear and the differential ring gear In the power transfer device, the cover member which covers at least a part of the differential gear includes the working oil reception which has the bottom, at least a part of which is disposed at a side of the drive pinion gear and above the differential ring gear, and the shield which extends outward in the radial direction of the differential ring gear from an end of the bottom that extends in the axial direction of the differential ring gear on the side opposite to the drive pinion gear. Consequently, working oil splashed toward the drive pinion gear after lubricating and cooling constituent elements included in the transmission, for example, can be received well by the shield and the bottom of the working oil reception. The bottom of the working oil reception has the first slope which is provided at a side of the drive pinion gear and above the differential ring gear and which is inclined downward, as the first slope extends away from the shield, such that working oil is led toward the meshing portion between the drive pinion gear and the differential ring gear. Consequently, working oil on the bottom of the working oil reception can be supplied well to the meshing between the drive pinion gear and the differential ring gear via the first slope. Thus, with the power transfer device, it is possible to lubricate and cool the meshing between the drive pinion gear and the differential ring gear well even in the case where the amount of working oil raked up by rotation of the differential ring gear is small.

DETAILED DESCRIPTION OF EMBODIMENTS

Now, an embodiment of the present disclosure will be described with reference to the drawings.

Figure 1:
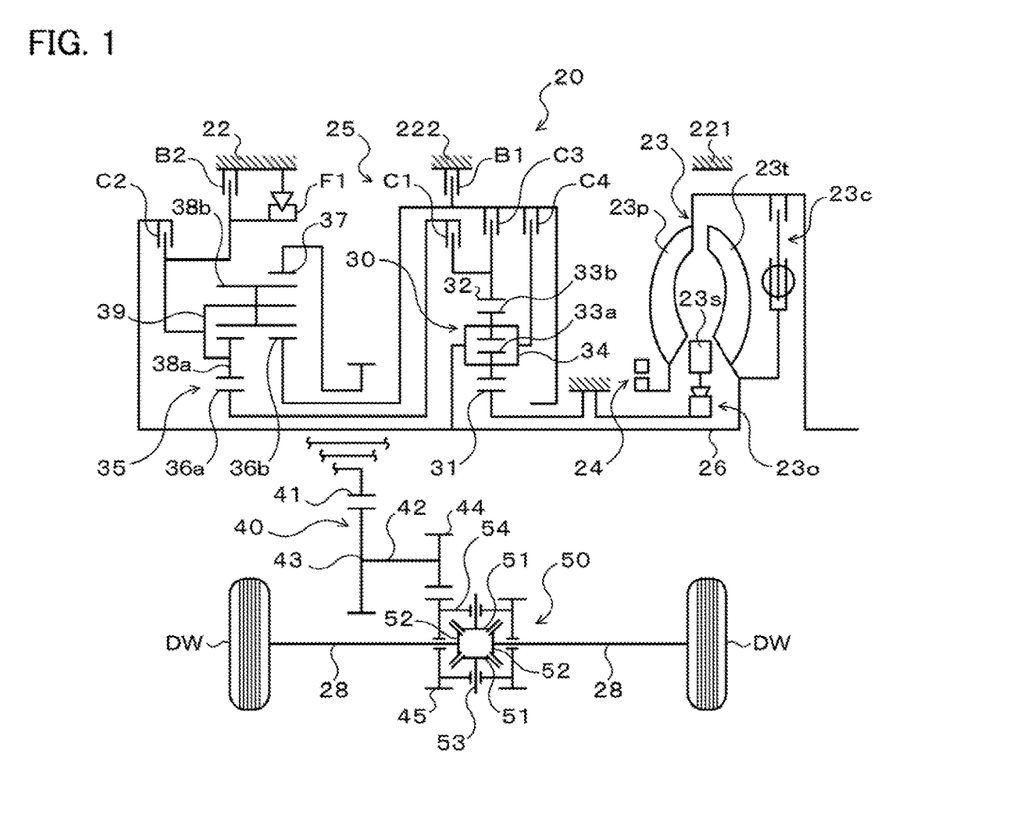
FIG. 1 is a diagram illustrating a schematic configuration of a power transfer device according to an embodiment of the present disclosure.

FIG. 1 illustrates a schematic configuration of a power transfer device 20 according to the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a converter housing 221 and a transaxle case 222 coupled to the converter housing 221, a fluid transmission apparatus (starting device) 23 housed in the converter housing 221, an oil pump 24, an automatic transmission 25 housed in the transaxle case 222, a gear mechanism (gear train) 40, a differential gear (differential mechanism) 50, and so forth.

The fluid transmission apparatus 23 is structured as a torque converter that includes a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts the rotational direction of the stator 23s to one direction, a lock-up clutch 23c, and so forth. It should be noted, however, that the fluid transmission apparatus 23 may be structured as a fluid coupling that does not include the stator 23s.

The oil pump 24 is structured as a gear pump that includes a pump assembly composed of a pump body and a pump cover, and an externally toothed gear connected to the pump impeller 23p of the fluid transmission apparatus 23 via a hub. The oil pump 24 is driven by power from the engine to suction working oil (ATF) stored in a working oil storage chamber 60 (see FIGS. 3 and 4) formed in the lower portion of the transmission case 22 and pressure-feed the working oil to a hydraulic control device (not illustrated).

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is held stationary with respect to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably (turnably) and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and separator plates, an oil chamber supplied with working oil, and so forth, and that is capable of connecting and disconnecting the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and separator plates, an oil chamber supplied with working oil, and so forth, and that is capable of connecting and disconnecting the planetary carrier 34 of the first planetary gear mechanism 30 and the second sun gear 36b of the second planetary gear mechanism 35 to and from each other.

The brake B1 is a multi-plate friction-type hydraulic brake that has a hydraulic servo structured from a plurality of friction plates and separator plates, an oil chamber supplied with working oil, and so forth, and that is capable of holding the second sun gear 36b of the second planetary gear mechanism 35 stationary to the transmission case 22 such that the second sun gear 36b is unrotatable and release the second sun gear 36b held stationary to the transmission case 22. The brake B2 is a multi-plate friction-type hydraulic brake that has a hydraulic servo structured from a plurality of friction plates and separator plates, an oil chamber supplied with working oil, and so forth, and that is capable of holding the planetary carrier 39 of the second planetary gear mechanism 35 stationary to the transmission case 22 such that the planetary carrier 39 is unrotatable and release the planetary carrier 39 held stationary to the transmission case 22.

In addition, the one-way clutch F1 includes an inner race coupled (fixed) to the planetary carrier 39 of the second planetary gear mechanism 35, an outer race, a plurality of sprags, a plurality of springs (leaf springs), a retainer, and so forth. The one-way clutch F1 transfers torque via the sprags when the outer race is rotated in one direction with respect to the inner race, and allows the inner race and the outer race to rotate with respect to each other when the outer race is rotated in the other direction with respect to the inner race. It should be noted, however, that the one-way clutch F1 may be of a roller type or the like, other than the sprag type.

Figure 2:
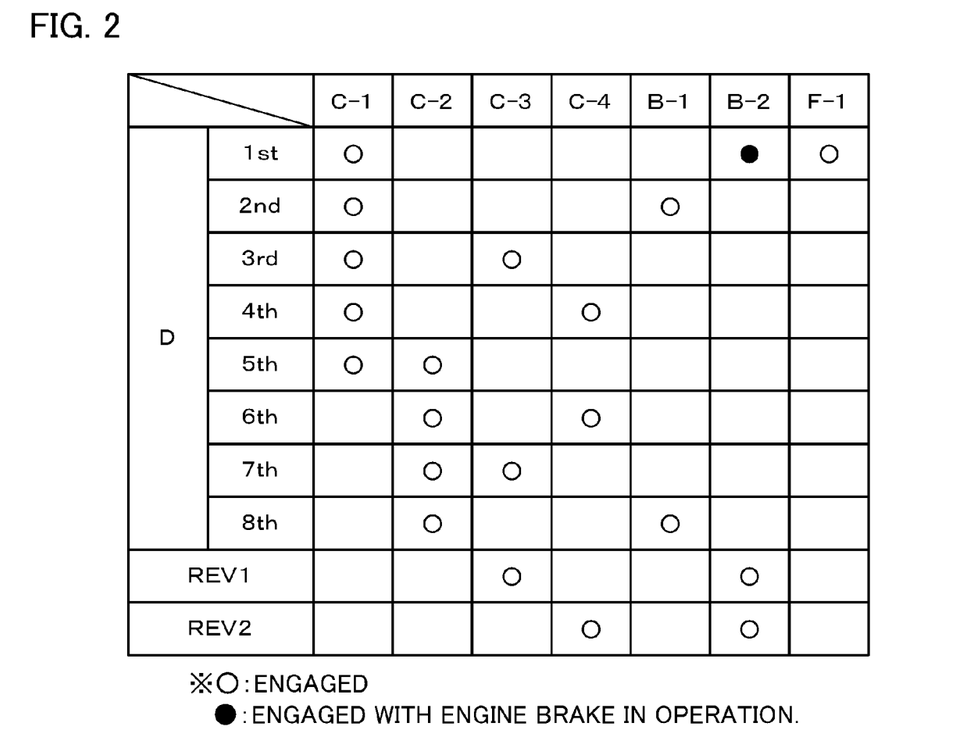
FIG. 2 is an operation table illustrating the relationship between shift speeds of an automatic transmission included in the power transfer device of FIG. 1 and the respective operating states of clutches and brakes.

The clutches C1 to C4 and the brakes B1 and B2 operate with working oil supplied thereto and discharged therefrom by the hydraulic control device (not illustrated). FIG. 2 is an operation table illustrating the relationship between shift speeds of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least any of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear 44 which is formed on (or fixed or coupled to) the counter shaft 42 with a predetermined clearance from the counter driven gear 43 and to which power from the automatic transmission 25 is transferred via the counter drive gear 41, the counter driven gear 43, and the counter shaft 42; and a differential ring gear 45 disposed below the drive pinion gear 44 (see FIG. 3) and meshed with the drive pinion gear 44. The counter shaft 42 is disposed in parallel with not only the input shaft 26 but also the axial direction of the differential ring gear 45 and the axial direction of the differential gear 50 (the axial direction of the drive shaft 28).

As illustrated in FIG. 1, the differential gear 50 includes a pair of (two) pinion gears 51, a pair of (two) side gears 52 fixed to the drive shaft 28 and meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, a pinion washer (not illustrated) is disposed between each of the pinion gears 51 and the differential case 54, and a side washer (not illustrated) is disposed between each of the side gears 52 and the differential case 54. The differential case 54 is rotatably supported by the transmission case 22 via a bearing (not illustrated) coaxially with the drive shaft 28.

Figure 3:
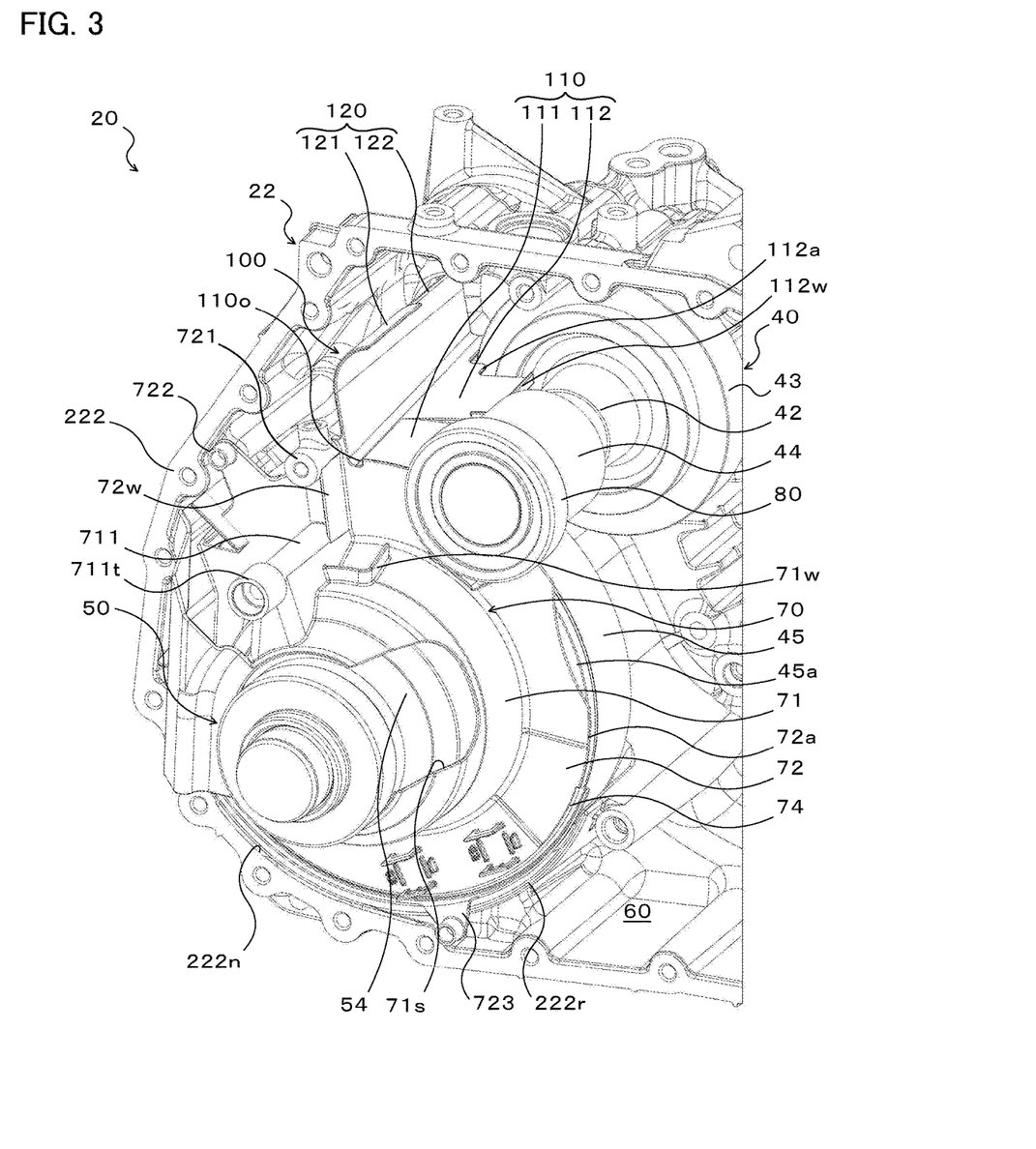
FIG. 3 is a perspective view illustrating an essential portion of the power transfer device.
Figure 4:
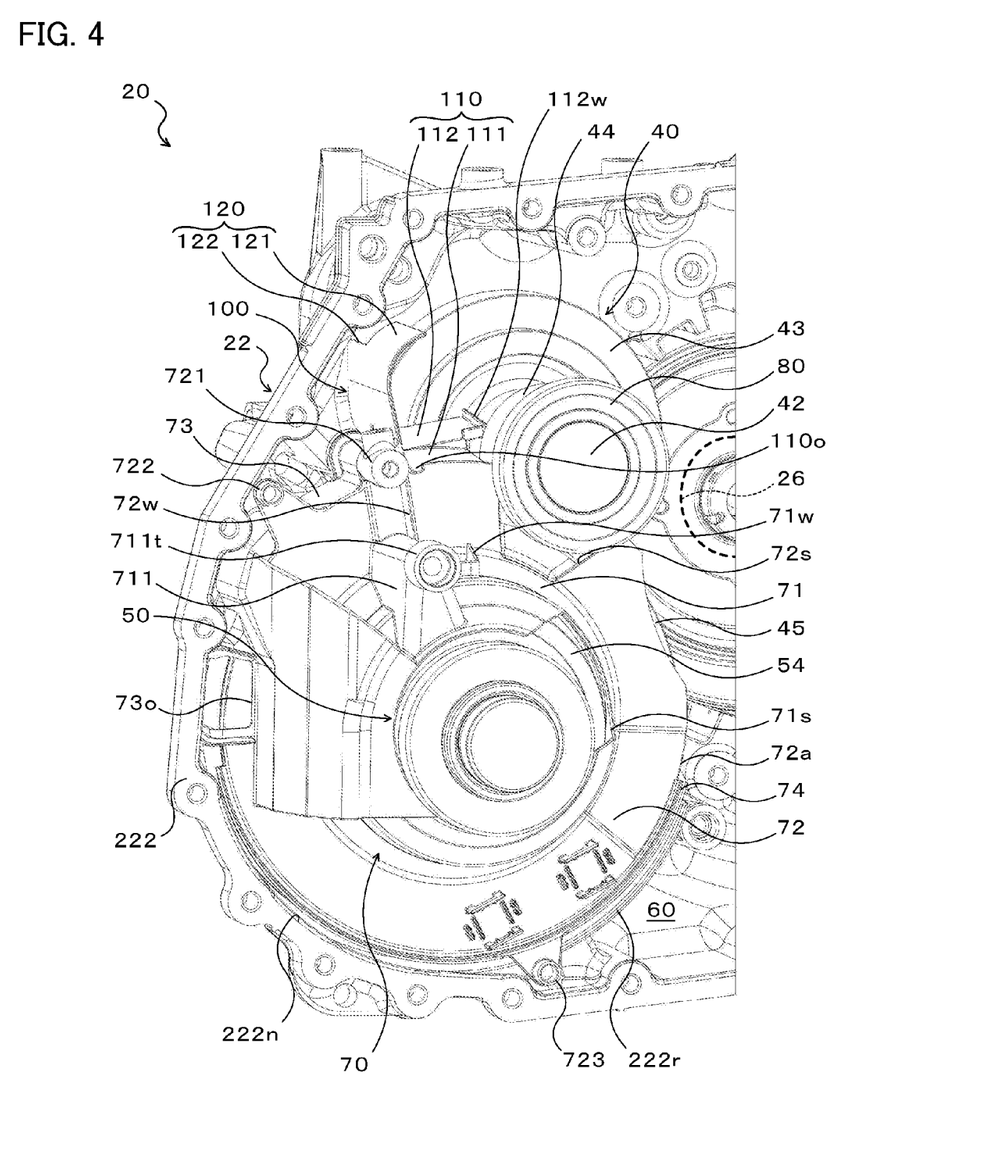
FIG. 4 is a perspective view illustrating the essential portion of the power transfer device.

Subsequently, a portion of the power transfer device 20 will be described with reference to FIGS. 3 to 7. FIGS. 3 and 4 illustrate the structure around the drive pinion gear 44, the differential ring gear 45, and the differential gear 50 which are disposed in the transmission case 22 (transaxle case 222). A space inside the transmission case 22 is defined by a reservoir plate (cover) 70 illustrated in FIGS. 5 to 7 and the transmission case 22, and divided into a differential chamber (not illustrated), in which the differential ring gear 45 and the differential gear 50 are disposed, and the working oil storage chamber 60, which stores working oil. In FIGS. 3 and 4, gear teeth formed on the outer periphery of the counter driven gear 43, the drive pinion gear 44, and the differential ring gear 45 are not illustrated. In the following description, the terms "upper" and "lower" indicate the "upper" and "lower" sides, respectively, in the vertical direction with the power transfer device 20 mounted on the vehicle.

The reservoir plate 70 includes: a tubular portion (cover portion) 71 that covers a part, which includes the upper portion, of the differential gear 50 from the outer side; a flange portion 72 that extends outward in the radial direction of the differential ring gear 45 (the radial direction of the differential gear 50, i.e. the radial direction of the drive shaft 28; hereinafter referred to simply as "radial direction") from an end portion of the tubular portion 71 on the differential ring gear 45 side (facing away from the viewer in FIG. 3) such that the flange portion 72 faces a side surface 45a (see FIG. 3) of the differential ring gear 45; and a differential ring surrounding portion 73 that extends from an outer peripheral edge portion 72a of the flange portion 72. The reservoir plate 70 which is structured from the tubular portion 71, the flange portion 72, and the differential ring surrounding portion 73 is integrally molded from a resin. It should be noted, however, that the reservoir plate 70 may be molded from a material other than a resin.

The tubular portion 71 extends in the axial direction of the differential ring gear 45 (the axial direction of the differential gear 50, i.e. the axial direction of the drive shaft 28; hereinafter referred to simply as "axial direction") from the inner peripheral portion of the flange portion 72. As illustrated in FIGS. 3 and 4, the tubular portion 71 is formed to extend along a part of the outer peripheral surface of the differential case 54 of the differential gear 50, and mainly surrounds a portion of the differential case 54 to which the differential ring gear 45 is attached and a portion of the differential case 54 excluding an end portion on the side opposite to the differential ring gear 45. In addition, the tubular portion 71 has a notched portion 71s formed to avoid interference with the transmission case 22 (converter housing 221). Further, a fixed portion 711 that has a fixed end 711t fixed to the converter housing 221 (see FIG. 1) and that projects outward in the radial direction is formed on the outer peripheral surface of the upper side of the tubular portion 71. In the embodiment, the converter housing 221 is fastened via bolts to a plurality of bolt holes formed in an end surface of the transaxle case 222 illustrated in FIGS. 3 and 4.

Figure 7:
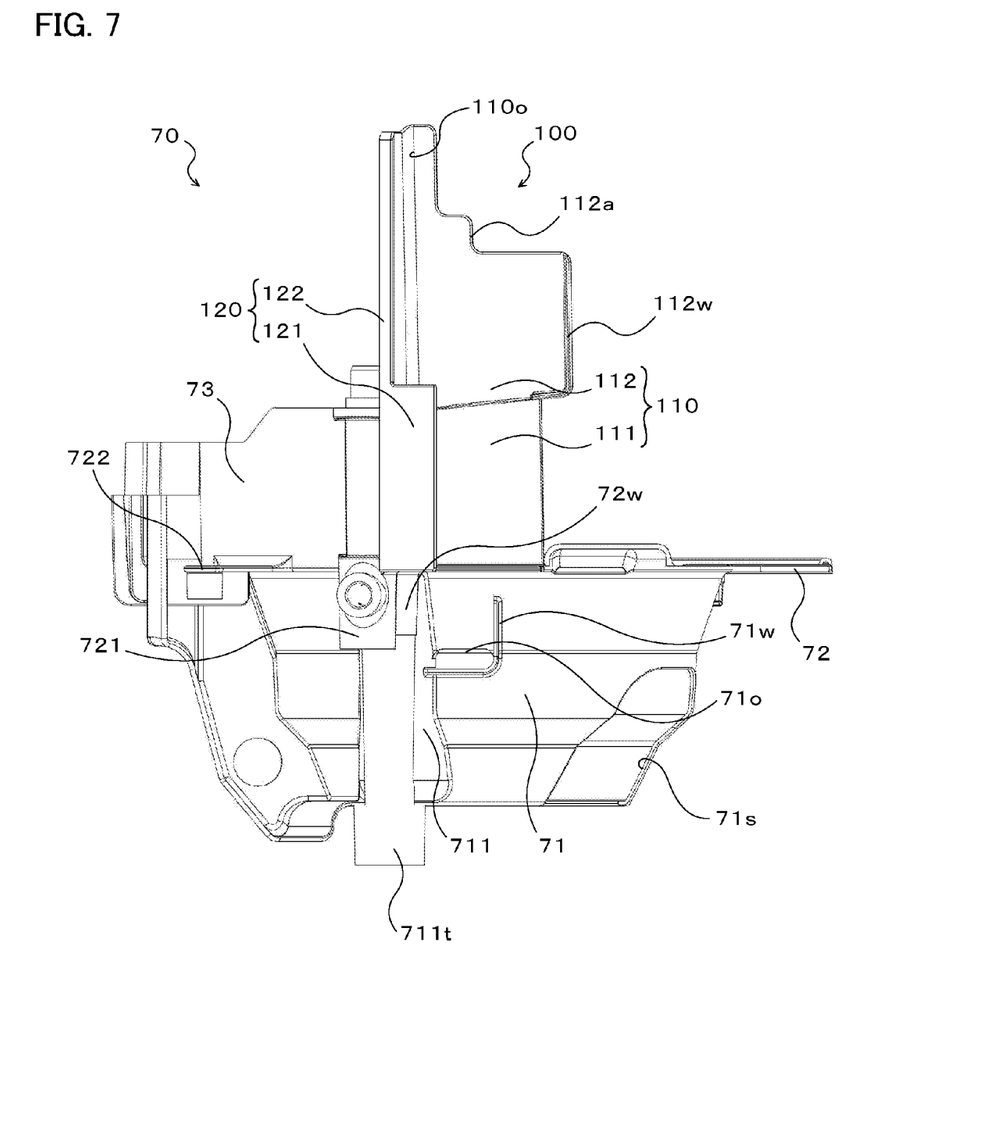
FIG. 7 is a top view illustrating the reservoir plate included in the power transfer device.

In addition, as illustrated in FIG. 7, a hole portion 710 that penetrates the tubular portion 71 at a side of the fixed portion 711 is formed in the outer peripheral surface of the upper side of the tubular portion 71 so as to extend along the circumferential direction of the outer peripheral surface. The hole portion 710 is formed in the tubular portion 71 such that working oil can be dripped into a gap between the pinion shaft 53 and the differential case 54 (see FIG. 1) of the differential gear 50. A wall portion 71w extends upward from the outer peripheral surface of the tubular portion 71 in the vicinity of the hole portion 710 so as to surround the hole portion 710 from the side opposite to the flange portion 72 and the fixed portion. 711 (and a restriction wall 72w to be discussed later). The wall portion 71w is formed in a generally L-shape to extend in the circumferential direction of the tubular portion 71 from an end surface of the fixed portion 711 around the hole portion 710 so as to face the flange portion 72, and to extend to the vicinity of the flange portion 72. It should be noted, however, that the wall portion 71w may be omitted from the tubular portion 71.

As illustrated in FIG. 4, the flange portion 72 has a notched portion 72s formed to avoid interference with the drive pinion gear 44. Consequently, the flange portion 72 extends in an arcuate shape (generally C-shape) along the outer periphery of the tubular portion 71. In addition, a seal holding portion 74 is provided at the lower portion of the outer peripheral edge portion 72a of the flange portion 72. A seal member (not illustrated) is mounted to the seal holding portion 74 to extend along the outer peripheral edge portion 72a. Further, first to third fixed portions 721, 722, and 723 to be fixed to the converter housing 221 and the transaxle case 222 are formed on the outer peripheral edge portion 72a of the flange portion 72. The first fixed portion 721 is formed above the fixed portion 711 which is formed on the tubular portion 71. As illustrated in FIG. 3 etc., the flange portion 72 has a restriction wall 72w provided between the first fixed portion 721 and the fixed portion 711 of the tubular portion 71 to project from a surface of the flange portion 72 to the tubular portion 71 side and to extend outward in the radial direction from a surface of the tubular portion 71 (fixed portion 711). It should be noted, however, that the restriction wall 72w may be omitted from the flange portion 72.

Figure 5:
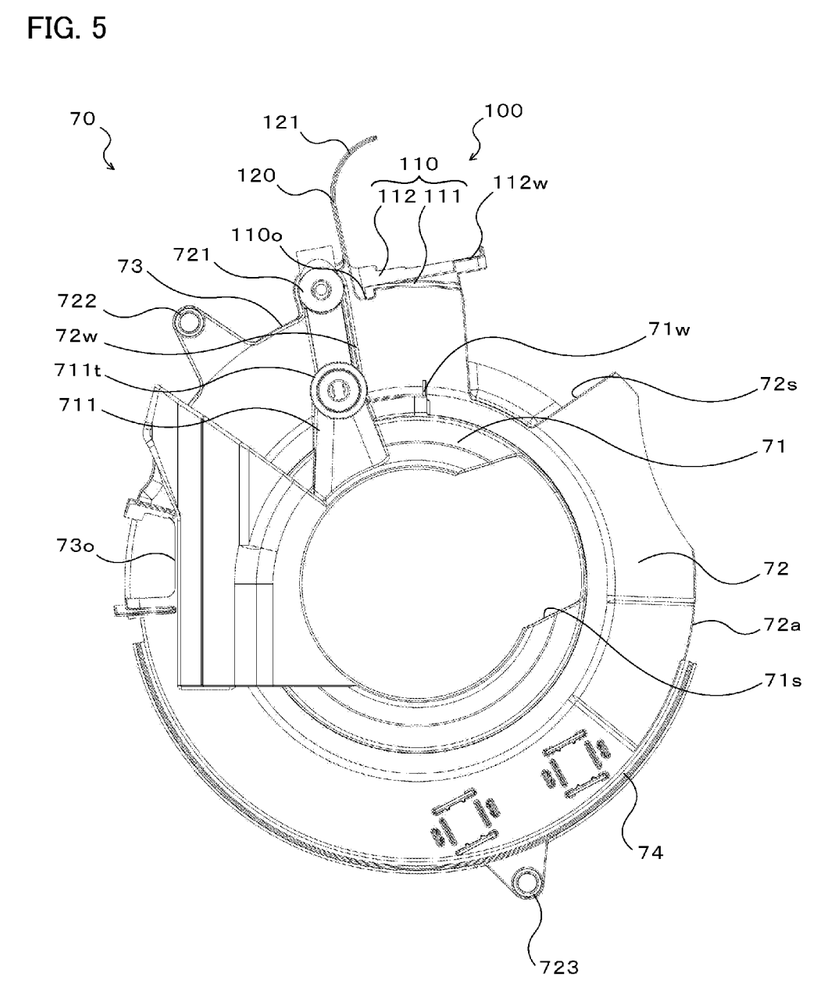
FIG. 5 is a front view illustrating a reservoir plate included in the power transfer device.
Figure 6:
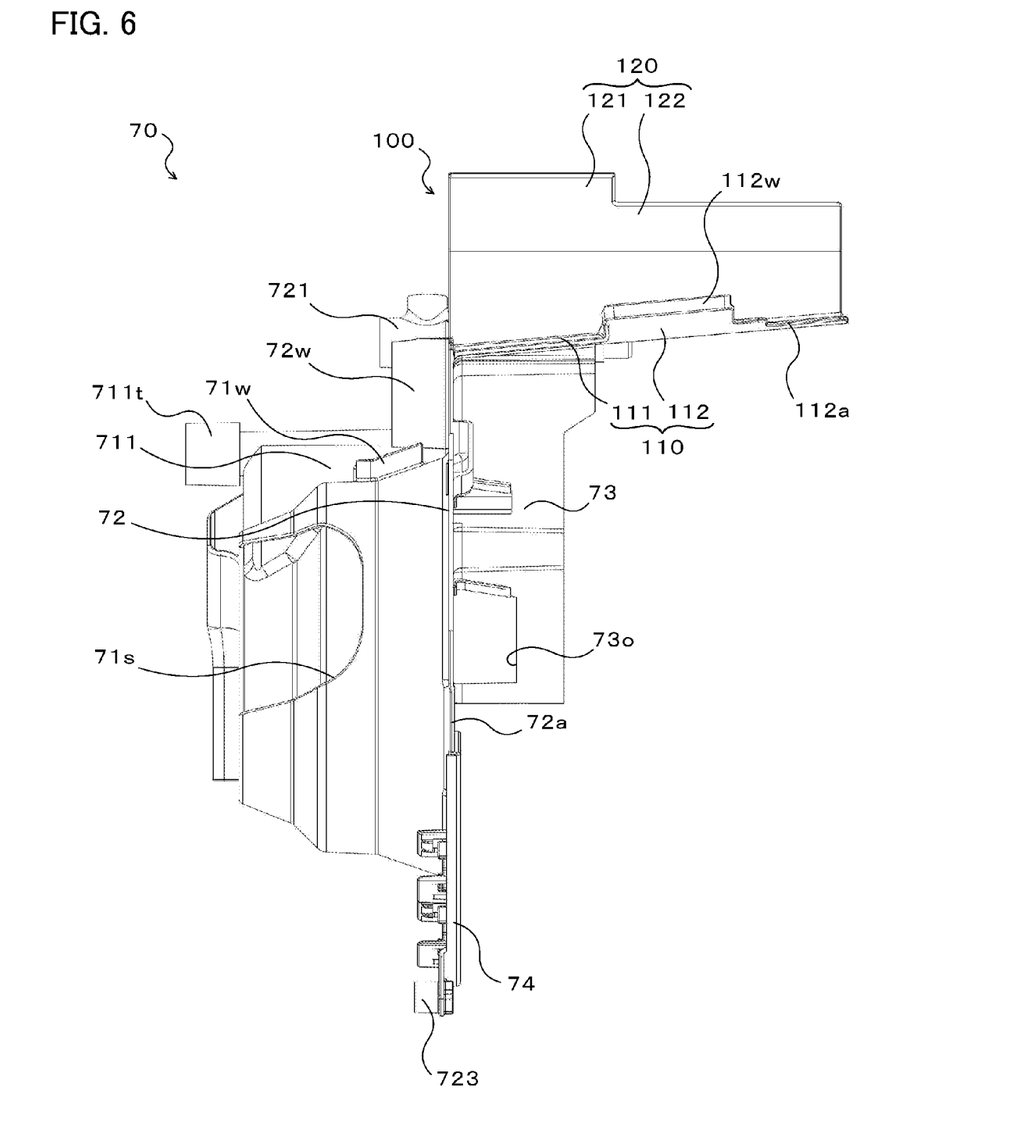
FIG. 6 is a side view illustrating the reservoir plate included in the power transfer device.

The differential ring surrounding portion 73 extends from the outer peripheral edge portion 72a of the flange portion 72 to the side opposite to the tubular portion 71 in the axial direction so as to cover about one-fourth of the outer peripheral surface of the differential ring gear 45 from above. As illustrated in FIGS. 4 to 6, an opening portion 73o is formed in the differential ring surrounding portion 73 and the flange portion 72. The opening portion 73o is formed to extend from generally the center portion of the differential ring surrounding portion 73 in the axial direction to generally the center portion of the flange portion 72 in the radial direction. The opening portion 73o is formed on the downstream side in the main rotational direction of the differential ring gear 45 (the direction in which the differential ring gear 45 is rotated when the vehicle on which the power transfer device 20 is mounted travels forward) as seen from the lowest point of the differential ring gear 45, and on the upstream side in the main rotational direction with respect to the meshing portion between the drive pinion gear 44 and the differential ring gear 45.

In the embodiment, as illustrated in FIGS. 3 and 4, the transaxle case 222 has an inner peripheral surface 222n that extends in an arcuate shape along the outer periphery of the differential ring gear 45, and a rib portion 222r formed to have an inner peripheral surface of the same radius of curvature as that is the inner peripheral surface 222n to surround a part of the differential ring gear 45. The reservoir plate 70 is disposed in the transmission case 22 such that the outer peripheral edge portion 72a of the flange portion 72 tightly contacts the inner peripheral surface 222n and the inner peripheral surface of the rib portion 222r via the seal member (not illustrated). In addition, the fixed end 711t which is formed on the fixed portion 711 of the tubular portion 71 and the first to third fixed portions 721, 722, and 723 which are formed on the outer peripheral edge portion 72a of the flange portion 72 are fixed to the converter housing 221 and the transaxle case 222.

Consequently, an inflow of working oil stored in the working oil storage chamber 60 into the differential chamber via a space between the outer peripheral edge portion 72a of the flange portion 72 and the inner peripheral surface 222n of the transmission case 22 and the inner peripheral surface of the rib portion 222r can be suppressed well by the seal member. In addition, even if working oil flows into the differential chamber, working oil in the differential chamber splashed by rotation of the differential ring gear 45 can be discharged well from the opening portion 73o (i.e., opening) which is formed in the differential ring surrounding portion 73 of the reservoir plate 70 to the working oil storage chamber 60 side. As a result, accumulation of working oil in the differential chamber can be suppressed well, and therefore the resistance against rotation of the differential ring gear 45 (stirring resistance) can be further reduced.

The reservoir plate 70 configured as discussed above further includes a working oil reception portion 100 (i.e., working oil reception) provided at the outer peripheral portion of the flange portion 72 and at a side of the first fixed portion 721 on the drive pinion gear 44 side. The working oil reception portion 100 has: a bottom portion 110 (i.e., bottom) that extends from the outer peripheral edge portion 72a of the flange portion 72 such that at least a part of the bottom portion 110 is positioned at a side of the drive pinion gear 44 and above the differential ring gear 45; and a shield portion 120 (i.e., shield) that extends outward in the radial direction from an end portion (i.e., end) of the bottom portion 110 that extends in the axial direction on the side opposite to the drive pinion gear 44. The entirety or at least a part of the working oil reception portion 100 may be molded integrally with the tubular portion 71, the flange portion 72, and the differential ring surrounding portion 73, or may be molded separately and thereafter fixed to the flange portion 72.

The bottom portion 110 is structured from a first slope portion 111 (i.e., first slope) that extends from the outer peripheral edge portion 72a of the flange portion 72, and a second slope portion 112 (i.e., second slop) disposed on the side opposite to the differential gear 50, that is, the flange portion 72, with respect to the first slope portion 111 in the axial direction. In the embodiment, as illustrated in FIG. 6, the bottom portion 110, that is, the first and second slope portions 111 and 112, is inclined downward as the bottom portion 110 extends closer to the differential gear 50, that is, the flange portion 72, in the axial direction. It should be noted, however, that the second slope portion 112 may be omitted from the bottom portion 110, and the first and second slope portions 111 and 112 may be formed to extend horizontally with respect to the axial direction.

As illustrated in FIGS. 3 to 5, the first slope portion 111 is disposed at a side of the drive pinion gear 44 and above the differential ring gear 45, and formed to extend generally along the outer periphery of the differential ring gear 45. As a result, the first slope portion 111 is formed such that at least a part of the first slope portion 111 is inclined downward as the first slope portion 111 extends away from the shield portion 120 such that working oil is led toward the meshing portion between the drive pinion gear 44 and the differential ring gear 45. It should be noted, however, that the first slope portion 111 may be inclined downward as a whole as the first slope portion 111 extends away from the shield portion 120.

As illustrated in FIG. 3, the second slope portion 112 is formed adjacent to the first slope portion 111 so as to be positioned at a side of the counter shaft 42 and the counter driven gear 43. In addition, as illustrated in FIG. 5, the second slope portion 112 is inclined downward as the second slope portion 112 extends closer to the shield portion 120. Further, as illustrated in FIGS. 3 to 7, a wall portion 112w (i.e., wall) that extends upward is formed at a part of an edge portion 112a of the second slope portion 112 on the side opposite to the shield portion 120, that is, on the side of the counter shaft 42 and the counter driven gear 43. The wall portion 112w is disposed between the drive pinion gear 44 and the counter driven gear 43 in the axial direction and closer to the counter shaft 42 than the outside diameter of the drive pinion gear 44.

In addition, as illustrated in FIGS. 3 and 5, the bottom portion 110 has a recessed portion (groove) 110o that extends along the shield portion 120 and that opens at an end portion of the bottom portion 110 on the flange portion 72 side. The recessed portion 110o is formed to be continuous with both the first and second slope portions 111 and 112 so as to be dented inward in the radial direction of the flange portion 72 with respect to the outer peripheral edge portion 72a of the flange portion 72. The recessed portion 110o opens at a position offset to the side opposite to the drive pinion gear 44 with respect to the top portion of the flange portion 72. It should be noted, however, that the recessed portion 110o may be omitted from the bottom portion 110.

The shield portion 120 is formed in a plate shape, and extends outward in the radial direction from an end portion of the first and second slope portions 111 and 112 of the bottom portion 110 that extends in the axial direction on the side opposite to the drive pinion gear 44, the counter shaft 42, and the counter driven gear 43. As illustrated in FIG. 6, the shield portion 120 includes: a first shield portion 121 formed to have generally the same width as that of the first slope portion 111 (so as to extend to a location slightly on the second slope portion 112 side with respect to the first slope portion 111); and a second shield portion 122 that extends from the first shield portion 121 to an end portion of the second slope portion 112 on the side opposite to the flange portion 72. As illustrated in FIGS. 3 to 5, the upper end of the first shield portion 121 is formed as curved toward the drive pinion gear 44 such that working oil splashed toward the first shield portion 121 does not flow into the differential chamber while avoiding interference with the transaxle case 222. As illustrated in FIG. 3, the second shield portion 122 is formed to be smaller in height than the first shield portion 121 in order to avoid interference with the transaxle case 222.

As illustrated in FIG. 4, the working oil reception portion 100 configured as discussed above is disposed on the side opposite to the input shaft 26 (see the dotted line in FIG. 4) of the automatic transmission 25 with respect to the drive pinion gear 44. Consequently, working oil, which is splashed from around the input shaft 26 toward the drive pinion gear 44 by rotation of the clutch C1 and the clutch C3 after being used to lubricate and cool the clutch C1, the clutch C3, etc. which are disposed in the vicinity of the drive pinion gear 44 and around the input shaft 26, can be received well by the bottom portion 110 and the shield portion 120 of the working oil reception portion 100.

In the embodiment, in addition, the bottom portion 110 is provided with not only the first slope portion 111, which is positioned at a side of the drive pinion gear 44, but also the second slope portion 112, which is positioned at a side of the counter shaft 42 and the counter driven gear 43. Thus, working oil, which is splashed from around the input shaft 26 toward the counter shaft 42 and the counter driven gear 43, can also be received well by the second slope portion 112. Further, the second slope portion 112 is inclined downward as the second slope portion 112 extends closer to the shield portion 120, and the wall portion 112w which extends upward is formed at a part of the edge portion 112a of the second slope portion 112 on the counter shaft 42 side (on the side opposite to the shield portion 120). Consequently, an outflow of the working oil, which is received by the second slope portion 112, from the edge portion 112a and down into the differential chamber can be suppressed better.

The first slope portion 111 of the working oil reception portion 100 is inclined downward as the first slope portion 111 extends away from the shield portion 120 such that working oil is led toward the meshing portion between the drive pinion gear 44 and the differential ring gear 45. Thus, in the power transfer device 20, working oil on the bottom portion 110 can be supplied well to the meshing portion between the drive pinion gear 44 and the differential ring gear 45 via the first slope portion 111. In the embodiment, in addition, the first and second slope portions 111 and 112 are inclined downward as the first and second slope portions 111 and 112 extend closer to the differential gear 50, that is, the flange portion 72, in the axial direction. Thus, the working oil received by the second slope portion 112 can be smoothly led to the first slope portion 111, and the working oil can be supplied evenly along the meshing portion between the drive pinion gear 44 and the differential ring gear 45 from the first slope portion 111.

In this way, in the power transfer device 20, the meshing portion between the drive pinion gear 44 and the differential ring gear 45 can be lubricated and cooled using working oil other than working oil raked up by rotation of the differential ring gear 45, that is, working oil splashed from around the input shaft 26. As a result, the meshing portion between the drive pinion gear 44 and the differential ring gear 45 can be lubricated and cooled well, even if the amount of working oil raked up by the differential ring gear 45 is relatively small, with the reservoir plate 70 separating the differential chamber and the working oil storage chamber 60 such that as small an amount of working oil as possible accumulates in the differential chamber. The working oil reception portion 100 may not necessarily be disposed on the side opposite to the input shaft 26 with respect to the drive pinion gear 44 as long as the working oil reception portion 100 can receive working oil splashed toward the drive pinion gear 44.

In the embodiment, in addition, the first and second slope portions 111 and 112 are inclined downward as the first and second slope portions 111 and 112 extend closer to the flange portion 72 in the axial direction. Thus, a part of the working oil received by the first and second slope portions 111 and 112 flows down from the first slope portion 111 onto the outer peripheral surface of the tubular portion 71 via the flange portion 72. The working oil which has reached the outer peripheral surface of the tubular portion 71 is supplied to the gap between the pinion shaft 53 and the differential case 54 of the differential gear 50 via the hole portion 710 which is formed in the outer peripheral surface of the tubular portion 71. Consequently, the working oil is mainly supplied via the gap to the pinion washer (not illustrated) which is disposed between each of the pinion gears 51 and the differential case 54, which makes it possible to lubricate and cool the pinion washer.

Further, the first and second slope portions 111 and 112 are provided with the recessed portion 110o which extends along the shield portion 120 and which opens in the outer peripheral edge portion 72a of the flange portion 72. Thus, working oil that has collided against the shield portion 120 and working oil received by the first and second slope portions 111 and 112 can be gathered by the recessed portion 110o, and caused to flow down well from the recessed portion 110o onto the flange portion 72. In the embodiment, in particular, the second slope portion 112 is inclined downward as the second slope portion 112 extends closer to the shield portion 120. Thus, working oil received by the second slope portion 112 can be gathered better by the recessed portion 110o.

In addition, as discussed above, the flange portion 72 is provided with the restriction wall 72w which is provided between the first fixed portion 721, which is formed at a side of the working oil reception portion 100 on the side opposite to the drive pinion gear 44, and the fixed portion 711 of the tubular portion 71 to project from a surface of the flange portion 72 to the tubular portion 71 side and to extend outward in the radial direction of the differential ring gear 45 from a surface of the tubular portion 71 (fixed portion 711). Consequently, flow of working oil, which has flowed down from the recessed portion 110o opening at a position offset to the side opposite to the drive pinion gear 44 with respect to the top portion of the flange portion 72, along a surface of the flange portion 72 to the side opposite to the drive pinion gear 44, that is, in the direction away from the hole portion 71o, can be suppressed well by the restriction wall 72w, and the working oil can be led to the hole portion 710 side better.

Further, as discussed above, the tubular portion 71 is provided with the wall portion 71w which extends upward such that the hole portion 710 is surrounded from the side opposite to the flange portion 72 and the fixed portion 711, and the restriction wall 72w. Consequently, flow of working oil, which is transmitted from a surface of the flange portion 72 and the restriction wall 72w to the outer peripheral surface of the tubular portion 71, in the direction away from the hole portion 71o, can be suppressed well by the wall portion 71w and the fixed portion 711, and the working oil can be led to the hole portion 710 further better with the working oil caused to temporarily be stored around the hole portion 710 by the wall portion 71w and an end surface of the fixed portion 711.

In this way, in the power transfer device 20, the tubular portion 71 is provided with the hole portion 710 which leads working oil, which flows down from the working oil reception portion 100 along the flange portion 72, to the differential gear 50. Consequently, the differential gear 50 can be lubricated well without using lubrication by working oil supplied from the oil pump 24, that is, forced lubrication. As a result, it is possible to favorably suppress an increase in size of the oil pump 24 and an increase in loss (loss torque) due to drive of the oil pump 24 by reducing the drive load of the oil pump 24.

As has been described above, the present disclosure provides a power transfer device including a transmission, a drive pinion gear to which power from the transmission is transferred, a differential ring gear disposed below the drive pinion gear and meshed with the drive pinion gear, a differential gear coupled to the differential ring gear, and a cover member that covers at least a part of the differential gear, characterized in that: the cover member includes a working oil reception portion that has a bottom portion, at least a part of which is disposed at a side of the drive pinion gear and above the differential ring gear, and a shield portion that extends outward in a radial direction of the differential ring gear from an end portion of the bottom portion that extends in an axial direction of the differential ring gear on a side opposite to the drive pinion gear; and the bottom portion has a first slope portion provided at a side of the drive pinion gear and above the differential ring gear and inclined downward, as the first slope portion extends away from the shield portion, such that working oil is led toward a meshing portion between the drive pinion gear and the differential ring gear.

In the power transfer device, the cover member which covers at least a part of the differential gear includes the working oil reception portion which has the bottom portion, at least a part of which is disposed at a side of the drive pinion gear and above the differential ring gear, and the shield portion which extends outward in the radial direction of the differential ring gear from an end portion of the bottom portion that extends in the axial direction of the differential ring gear on the side opposite to the drive pinion gear. Consequently, working oil splashed toward the drive pinion gear after lubricating and cooling constituent elements included in the transmission, for example, can be received well by the shield portion and the bottom portion of the working oil reception portion. The bottom portion of the working oil reception portion has the first slope portion which is provided at a side of the drive pinion gear and above the differential ring gear and which is inclined downward, as the first slope portion extends away from the shield portion, such that working oil is led toward the meshing portion between the drive pinion gear and the differential ring gear. Consequently, working oil on the bottom portion of the working oil reception portion can be supplied well to the meshing portion between the drive pinion gear and the differential ring gear via the first slope portion. Thus, with the power transfer device, it is possible to lubricate and cool the meshing portion between the drive pinion gear and the differential ring gear well even in the case where the amount of working oil raked up by rotation of the differential ring gear is small.

The bottom portion of the working oil reception portion may have a second slope portion disposed on a side opposite to the differential gear with respect to the first slope portion in the axial direction and inclined downward as the second slope portion extends closer to the shield portion; and the first and second slope portions may be inclined downward as the first and second slope portions extend closer to the differential gear in the axial direction. In this way, by providing the working oil reception portion with a second slope portion inclined downward as the second slope portion extends closer to the shield portion, working oil splashed toward the drive pinion gear can also be received by the second slope portion, and an outflow of the received working oil from an edge portion of the second slope portion on the side opposite to the shield portion can be suppressed well. With the first and second slope portions inclined downward as the first and second slope portions extend closer to the differential gear, working oil received by the second slope portion can be smoothly led to the first slope portion, and the working oil can be supplied evenly along the meshing portion between the drive pinion gear and the differential ring gear from the first slope portion.

The drive pinion gear may be coupled to a counter shaft disposed in parallel with the axial direction; and a wall portion that extends upward may be formed at at least a part of an edge portion of the second slope portion on a side of the counter shaft. Consequently, an outflow of the working oil, which is received by the second slope portion, from an edge portion of the second slope portion on the counter shaft side can be suppressed better.

The counter shaft may have a counter driven gear disposed with a predetermined clearance from the drive pinion gear; and the wall portion may be disposed between the drive pinion gear and the counter driven gear in the axial direction and closer to the counter shaft than an outside diameter of the drive pinion gear.

The working oil reception portion may be disposed on a side opposite to an input shaft of the transmission with respect to the drive pinion gear. Consequently, working oil splashed toward the drive pinion gear from around the input shaft of the transmission by rotation of a rotary element etc. disposed around the input shaft after lubricating and cooling the rotary element etc. can be received better by the working oil reception portion.

The power transfer device according to the present disclosure may further include a case that houses the transmission, the drive pinion gear, the differential ring gear, and the differential gear; and the cover member may divide a space in the case into a differential chamber, in which the differential ring gear and the differential gear are disposed, and a working oil storage chamber, in which the working oil is stored. In this way, with the power transfer device according to the present disclosure, with the cover member separating the differential chamber and the working oil storage chamber, the meshing portion between the drive pinion gear and the differential ring gear can be lubricated and cooled well using working oil other than working oil raked up by rotation of the differential ring gear even in the case where the amount of working oil raked up by the differential ring gear is small.

The cover member may have an opening portion formed on a downstream side, in a main rotational direction of the differential ring gear, as seen from a lowest point of the differential ring gear and on an upstream side, in the main rotational direction, with respect to the meshing portion between the drive pinion gear and the differential ring gear.

The present disclosure is not limited to the embodiment described above in any way, and it is a matter of course that the present disclosure may be modified in various ways without departing from the scope of the present disclosure. Further, the mode for carrying out the present disclosure described above is merely a specific form of the disclosure described in the "SUMMARY" section, and does not limit the elements of the disclosure described in the "SUMMARY" section.

INDUSTRIAL APPLICABILITY

The present disclosure can be utilized in the power transfer device manufacturing industry etc.

The invention claimed is:
1. A power transfer device comprising
   a transmission,
   a drive pinion gear to which power from the transmission is transferred,
   a differential ring gear disposed below the drive pinion gear and meshed with the drive pinion gear, the differential ring gear extending in an axial direction and a radial direction,
   a differential gear coupled to the differential ring gear, and
   a cover that covers at least a part of the differential gear, wherein:
      the cover includes a working oil reception that has a bottom, at least a part of which is disposed at a side of the drive pinion gear and above the differential ring gear, and a shield that extends outward in the radial direction from an end of the bottom on a side opposite to the drive pinion gear;
      the bottom has a first slope provided at the side of the drive pinion gear and above the differential ring gear and inclined downward, as the first slope extends away from the shield, such that working oil is led toward a meshing portion between the drive pinion gear and the differential ring gear;
      in the axial direction of the differential ring gear, a second slope is disposed on a side opposite to the differential gear relative to the first slope and is disposed adjacent to the first slope; and
      an inclination angle of the second slope is different from an inclination angle of the first slope.

2. The power transfer device according to claim 1, wherein:
   the bottom of the working oil reception has the second slope disposed on the side opposite to the differential gear with respect to the first slope in the axial direction and inclined downward as the second slope extends closer to the shield; and
   the first and second slopes are inclined downward as the first and second slopes extend closer to the differential gear in the axial direction.

3. The power transfer device according to claim 2, further comprising:
   a case that houses the transmission, the drive pinion gear, the differential ring gear, and the differential gear, wherein
   the cover divides a space in the case into a differential chamber, in which the differential ring gear and the differential gear are disposed, and a working oil storage chamber, in which the working oil is stored.

4. The power transfer device according to claim 2, wherein
   the working oil reception is disposed on a side opposite to an input shaft of the transmission with respect to the drive pinion gear.

5. The power transfer device according to claim 4, further comprising:
   a case that houses the transmission, the drive pinion gear, the differential ring gear, and the differential gear, wherein
   the cover divides a space in the case into a differential chamber, in which the differential ring gear and the differential gear are disposed, and a working oil storage chamber, in which the working oil is stored.

6. The power transfer device according to claim 2, wherein:
   the drive pinion gear is coupled to a counter shaft disposed in parallel with the axial direction; and
   a wall that extends upward is formed at at least a part of an edge of the second slope on a side of the counter shaft.

7. The power transfer device according to claim 6, further comprising:
   a case that houses the transmission, the drive pinion gear, the differential ring gear, and the differential gear, wherein
   the cover divides a space in the case into a differential chamber, in which the differential ring gear and the differential gear are disposed, and a working oil storage chamber, in which the working oil is stored.

8. The power transfer device according to claim 6, wherein
   the working oil reception is disposed on a side opposite to an input shaft of the transmission with respect to the drive pinion gear.

9. The power transfer device according to claim 8, further comprising:
   a case that houses the transmission, the drive pinion gear, the differential ring gear, and the differential gear, wherein
   the cover divides a space in the case into a differential chamber, in which the differential ring gear and the differential gear are disposed, and a working oil storage chamber, in which the working oil is stored.

10. The power transfer device according to claim 6, wherein:
the counter shaft has a counter driven gear which is disposed with a predetermined clearance from the drive pinion gear and to which power from the transmission is transferred; and
the wall is disposed between the drive pinion gear and the counter driven gear in the axial direction and closer to the counter shaft than an outside diameter of the drive pinion gear.

11. The power transfer device according to claim 10, further comprising:
a case that houses the transmission, the drive pinion gear, the differential ring gear, and the differential gear, wherein
the cover divides a space in the case into a differential chamber, in which the differential ring gear and the differential gear are disposed, and a working oil storage chamber, in which the working oil is stored.

12. The power transfer device according to claim 10, wherein:
the working oil reception is disposed on a side opposite to an input shaft of the transmission with respect to the drive pinion gear.

13. The power transfer device according to claim 12, wherein
the cover has an opening formed on a downstream side, in a main rotational direction of the differential ring gear, as seen from a lowest point of the differential ring gear and on an upstream side, in the main rotational direction, with respect to the meshing portion between the drive pinion gear and the differential ring gear.

14. The power transfer device according to claim 12, further comprising:
a case that houses the transmission, the drive pinion gear, the differential ring gear, and the differential gear, wherein
the cover divides a space in the case into a differential chamber, in which the differential ring gear and the differential gear are disposed, and a working oil storage chamber, in which the working oil is stored.

15. The power transfer device according to claim 14, wherein:
the cover has an opening formed on a downstream side, in a main rotational direction of the differential ring gear, as seen from a lowest point of the differential ring gear and on an upstream side, in the main rotational direction, with respect to the meshing portion between the drive pinion gear and the differential ring gear.

16. The power transfer device according to claim 1, wherein
the working oil reception is disposed on a side opposite to an input shaft of the transmission with respect to the drive pinion gear.

17. The power transfer device according to claim 16, further comprising:
a case that houses the transmission, the drive pinion gear, the differential ring gear, and the differential gear, wherein
the cover divides a space in the case into a differential chamber, in which the differential ring gear and the differential gear are disposed, and a working oil storage chamber, in which the working oil is stored.

18. The power transfer device according to claim 1, further comprising:
a case that houses the transmission, the drive pinion gear, the differential ring gear, and the differential gear, wherein
the cover divides a space in the case into a differential chamber, in which the differential ring gear and the differential gear are disposed, and a working oil storage chamber, in which the working oil is stored.

* * * * *